United States Patent [19]

Jeske

[11] 4,126,233
[45] Nov. 21, 1978

[54] TOOL TRANSFER MECHANISM FOR MACHINE TOOLS

[75] Inventor: Richard G. Jeske, Hales Corners, Wis.

[73] Assignee: Kearney & Trecker Corporation, West Allis, Wis.

[21] Appl. No.: 773,905

[22] Filed: Mar. 3, 1977

[51] Int. Cl.² .............................................. B23Q 3/157
[52] U.S. Cl. ............................. 214/1 BB; 214/1 BD; 214/147 T; 294/104; 294/110 B
[58] Field of Search ............... 294/104, 110 R, 110 B, 294/116; 214/1 BB, 1 BC, 1 BD, 147 T; 29/568

[56] References Cited

U.S. PATENT DOCUMENTS 4,013,176  3/1977  Lohneis ............................ 214/1 BD

FOREIGN PATENT DOCUMENTS 1,230,027  9/1960  France ................................ 294/110 B Primary Examiner—Albert J. Makay
Assistant Examiner—George F. Abraham
Attorney, Agent, or Firm—Cyril M. Hajewski; Donald J. Piggott

[57] ABSTRACT

A tool transfer arm is pivotally mounted on a tool transfer housing which is movable between a tool storage magazine and the spindle of a machine tool to transfer tools between the tool storage magazine and the spindle. The tool transfer arm has two pair of toolholder jaws, one pair on each end thereof. One toolholder jaw of each pair is movable and the other jaw is fixed. Each movable jaw is pivotable between an open and closed position by a clamp arm which is pivotally connected to the corresponding movable jaw and slidably engages an arcuate guide slot in the tool transfer arm. A cylindrical abutment on the spindle head near the spindle and on the tool storage magazine bears against the adjacent clamp arm when the tool transfer arm approaches either the tool storage magazine or the spindle in one angular orientation to close the corresponding movable jaw and clamp a toolholder in the jaws for removal from the tool storage magazine or spindle. A conical abutment on the spindle head near the spindle and on the tool storage magazine bears against the adjacent clamp arm when the tool transfer arm approaches either the tool storage magazine or the spindle in the other angular orientation to open the corresponding movable jaw and release the toolholder clamped in the jaws for insertion into the tool storage magazine or spindle.

9 Claims, 28 Drawing Figures

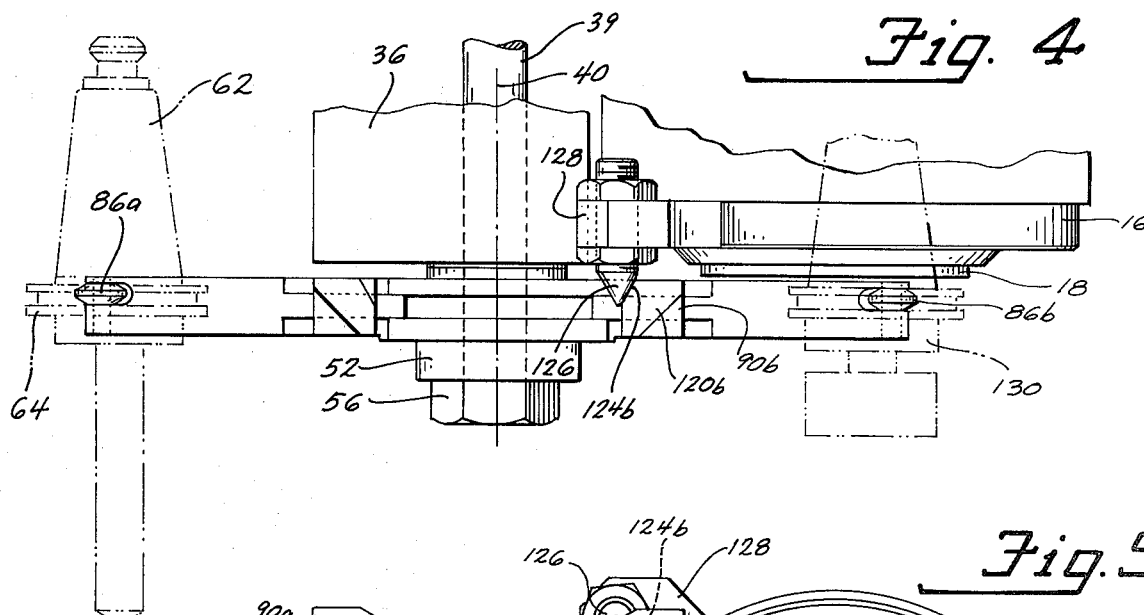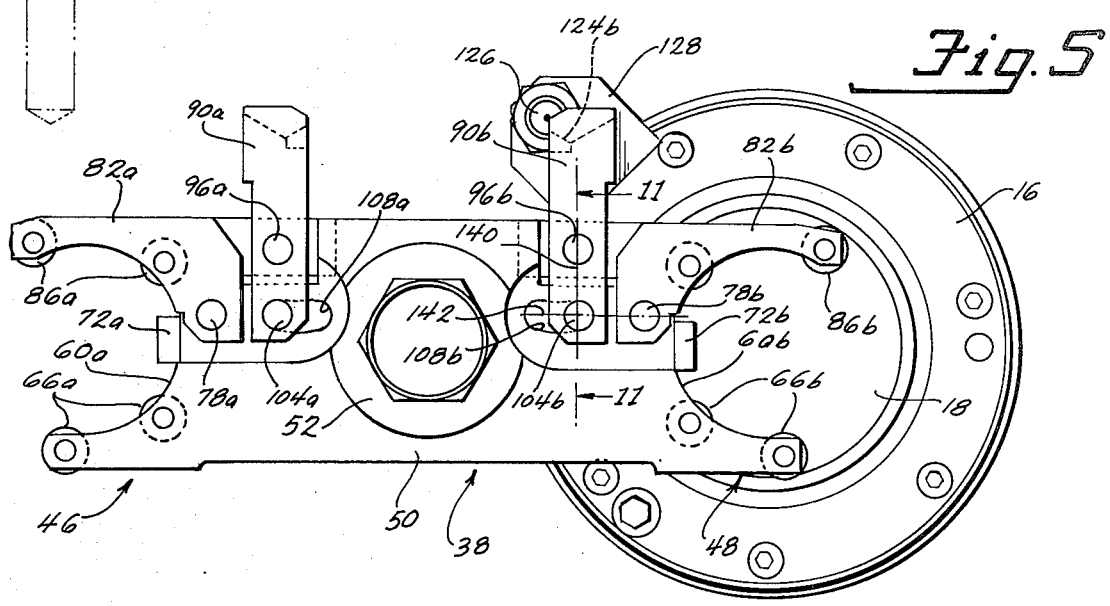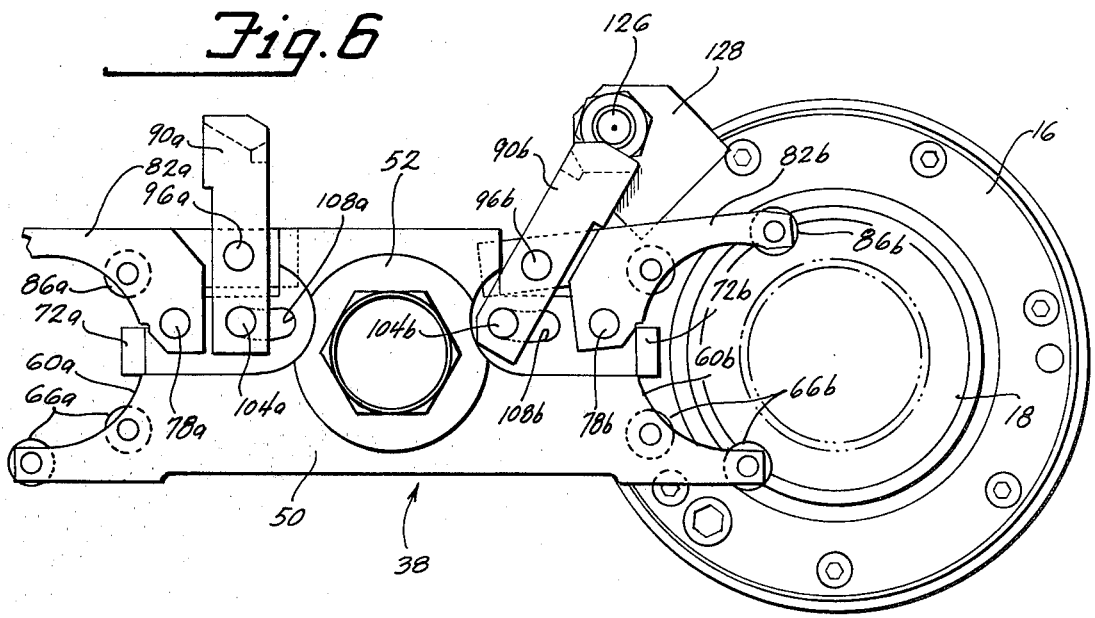

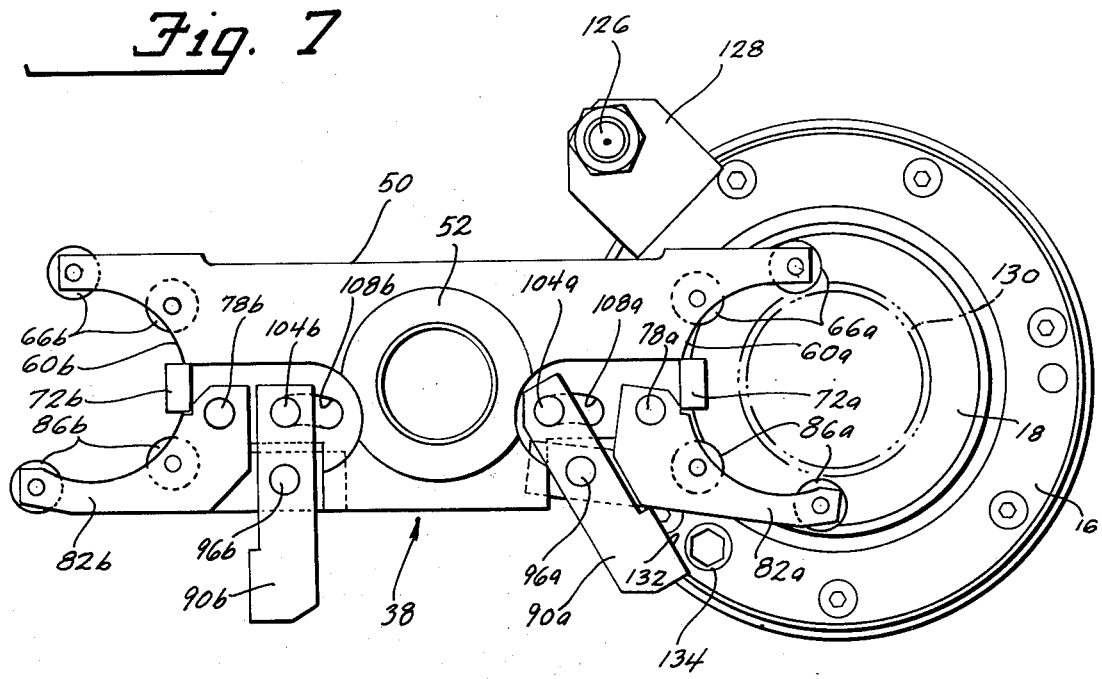
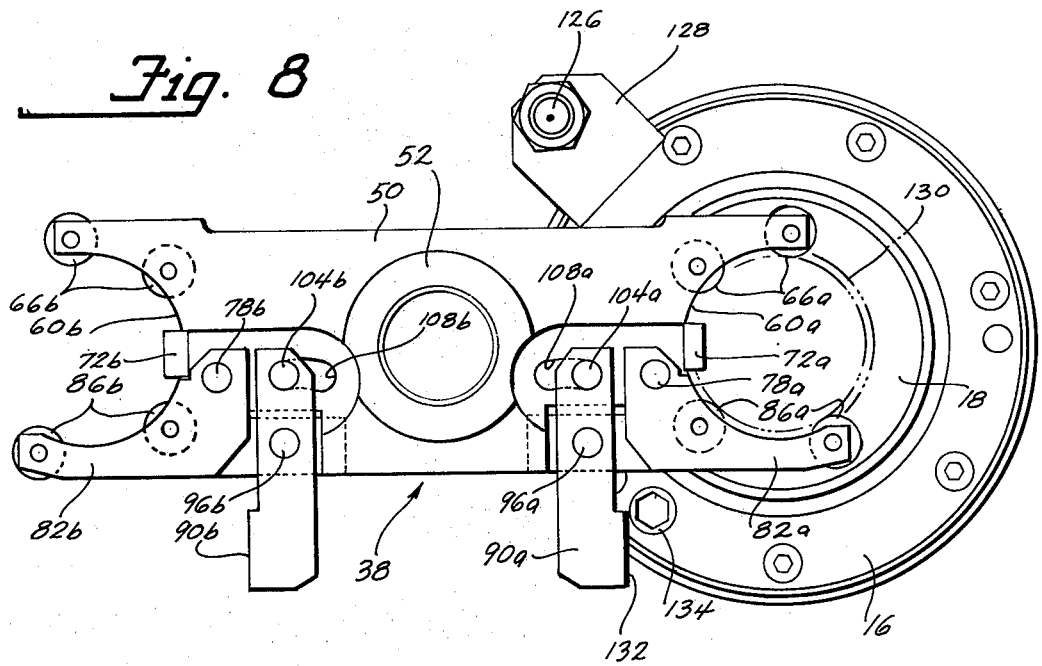

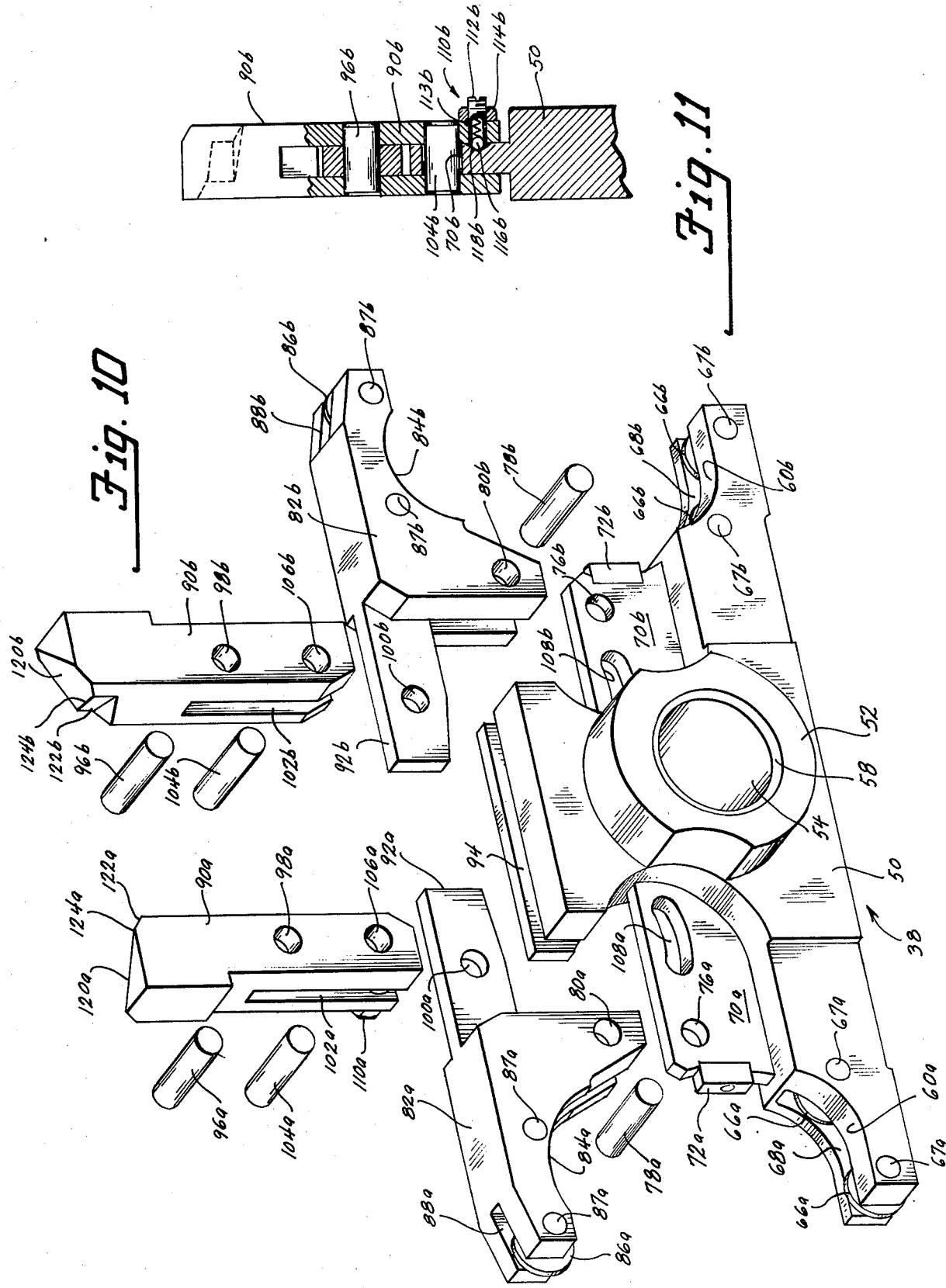

TOOL TRANSFER MECHANISM FOR MACHINE TOOLS

BACKGROUND OF THE INVENTION

This invention relates to article transfer mechanisms for machine tools or for other machines in which a plurality of movable articles are stored in a storage magazine and are selectively transferred from the storage magazine to an article support on the machine or vice versa.

In the past, the tool transfer arms for machine tools had to be clamped closed by a hydraulically or pnuematically operated cylinder during the time that the tool was being moved from the tool storage magazine to the machine tool spindle, or vice versa, or had to be held in place by spring clamps. One example of the former case is disclosed in U.S. Pat. No. 3,760,958, which was issued on Sept. 25, 1973, for a "CLAMPING TOOL CHANGER MECHANISM AND ACTUATING MECHANISM FOR A MACHINE TOOL." One example of the latter case is disclosed in U.S. Pat. No. 3,840,981, which was issued on Oct. 15, 1974, for a "TOOL CHANGE ARM GRIP."

The hydraulically orpneumatically operated clamps are, however, relatively expensive and are subject to failure of the fluid system and components thereof while the spring clamps are relatively limited in terms of the clamping force that they can provide and tend to weaken with use.

Accordingly, the principal object of this invention is to provide an article transfer mechanism which is simpler and less expensive than the prior pneumatically or hydraulically clamped mechanisms, which is capable of providing a constant clamping pressure which does not significantly diminish with use, and which is more reliable than either of the above-noted prior art clamping mechanisms.

Other objects and advantages of the invention will be apparent from the description which follows.

SUMMARY OF THE INVENTION

An article transfer housing is movably mounted on a frame for movement into and out of proximity with an article storage magazine and an article support to transfer articles therebetween. An article transfer arm is pivotally mounted on the article transfer housing and has a pair of article holder jaws on at least one end thereof. One of the article holder jaws is fixed and the other is movable. The movable article holder jaw is pivotally linked to a clamp arm which engages a guide surface on the article transfer arm and is movable between an open position which opens the movable jaw, and a closed position which closes the movable jaw. A first abutment on the article support is positioned to bear against the clamp arm and move it from its open position to its closed position. A second abutment on the article support is positioned to bear against the clamp arm and move it from its closed position to its open position. A second pair of article holder jaws, which are identical in structure with the above-described article holder jaws, are preferably mounted on the other end of the article transfer arm.

BRIEF DESCRIPTION OF THE DRAWINGS

FIG. 4 is a fragmentary plan view of the spindle head of FIGS. 2 and 3 with the tool transfer arm adjacent thereto and having just inserted a tool into the spindle;

FIG. 5 is a fragmentary front elevation view of the spindle head and tool transfer arm with the movable toolholder jaw adjacent to the spindle in its fully closed position;

FIG. 6 is a fragmentary front elevation view of the spindle head and tool transfer arm with the movable toolholder jaw adjacent to the spindle in its fully opened position;

FIG. 7 is a fragmentary front elevation view of the spindle head and tool transfer arm with the tool transfer arm rotated through 180° from the position shown in FIG. 6 and the movable toolholder jaw adjacent to the spindle in its fully opened position;

FIG. 8 is a fragmentary front elevation view of the spindle head and tool transfer arm similar to FIG. 7 but with the movable toolholder jaw adjacent to the spindle in its fully closed position;

FIG. 10 is an exploded perspective view of the tool transfer arm showing the various parts thereof and their interrelation; and FIG. 11 is a fragmentary cross-sectional view of the tool transfer arm taken on the line 11—11 of FIG. 5.

DESCRIPTION OF THE PREFERRED EMBODIMENT

Figure 1:
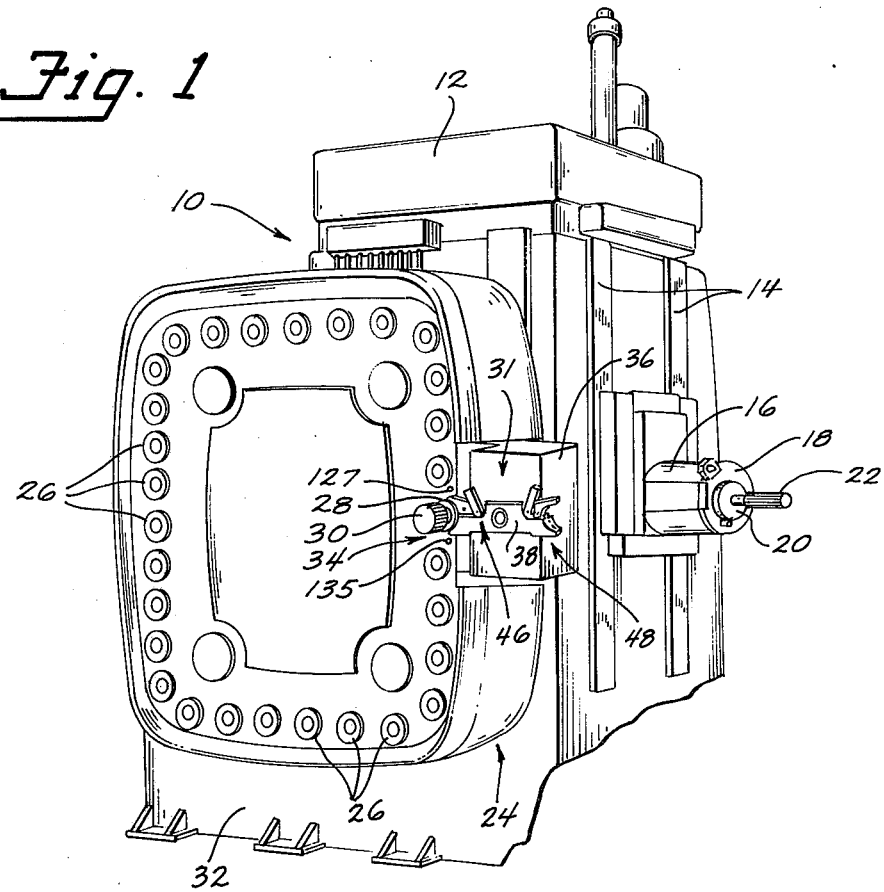
FIG. 1 is a perspective view of a horizontal machining center which utilizes the preferred embodiment of the invention.
Figure 2:
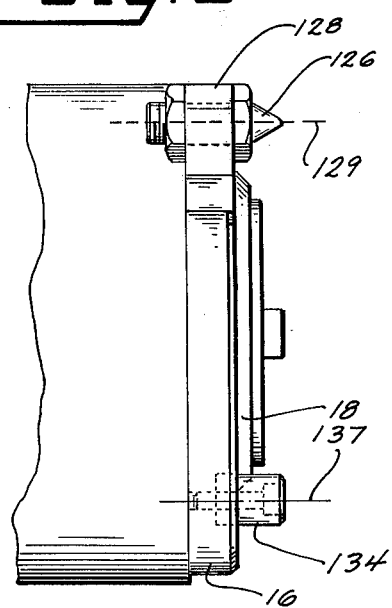
FIG. 2 is a fragmentary side elevation view of the nose portion of the spindle head of the machining center shown in FIG. 1.

Referring to FIG. 1, the preferred embodiment of the invention is shown mounted on a horizontal machining center 10 which includes an upright 12 which is slidably mounted on a bed (not shown) for movement along a horizontal Z axis. Upright 12 carries a pair of vertical ways 14 upon which a spindle head 16 carrying a spindle 18 is slidably mounted for movement along a vertical Y axis perpendicular to the Z axis. Spindle 18 is rotatable about the Z axis and includes the conventional means for receiving a toolholder 20 holding a tool 22 and for clamping toolholder 20 into spindle 18.

Spindle 18 is rotated by a conventional electric motor and gear train (not shown) mounted within spindle head 16 and performs work on a workpiece 136 (FIG. 9a) mounted on a conventional worktable (not shown) which is slidably mounted on the bed for movement along a horizontal X axis perpendicular to both the Z and Y axes.

A conventional tool storage magazine 24 having a plurality of receptacles 26 for receiving toolholders 28 carrying tools 30 is mounted on a frame 32 at the side of upright 12 in position to enable toolholders 28 to be transferred to and from spindle 18 by a tool transfer mechanism 31 also mounted on frame 32. Receptacles 26 are movable by conventional means past a tool transfer station 34 at which toolholders 28 are either withdrawn from receptacles 26 or are inserted therein by tool transfer mechanism 31. Conventional control means (not shown) is provided to position any desired receptacle 26 opposite tool transfer station 34.

Figure 9A:
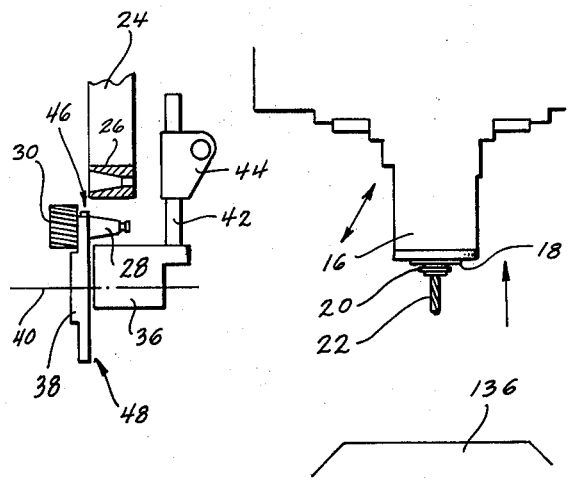
FIGS. 9a through 9r are a sequence of fragmentary diagrammatic plan views of the tool storage magazine, spindle and tool transfer mechanism, with the tool transfer housing and tool transfer arm being shown in the sequence of positions required to transfer a new tool into the spindle, return the tool previously in the spindle to the tool storage magazine, and pick up the next tool to be transferred to the spindle.

Tool transfer mechanism 31 includes a housing 36 and a tool transfer arm 38 which is attached to a shaft 39 (FIG. 9d) rotatably mounted in housing 36 for rotation about a pivot axis 40 (FIG. 4). Tool transfer arm 38 can be moved axially between a retracted position, shown in FIG. 9a, and an extended position, shown in FIG. 9d. Tool transfer housing 36 is movably mounted on frame 32 for movement between tool transfer station 34 and spindle 18, as illustrated in FIGS. 9a through 9r. Referring to FIG. 9a, tool transfer housing 36 is rigidly mounted on a support arm 42 which is slidably mounted in a base 44 for movement between a central position shown in FIG. 9a, an extended position shown in FIG. 9c, and a retracted position shown in FIG. 9j. Arm 42 is moved between its central, extended and retracted positions by conventional power actuated means which is not shown in the drawings but which will be obvious to those skilled in the art. Tool transfer arm 38 is rotated and moved between its extended and retracted positions by power actuated means (not shown) which will also be obvious to those skilled in the art.

Figure 9B:
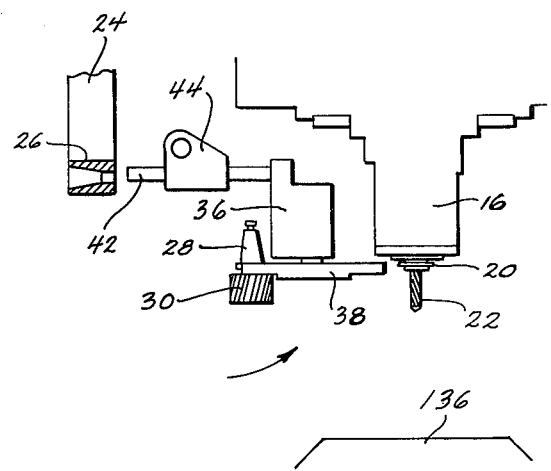
Figure 9C:
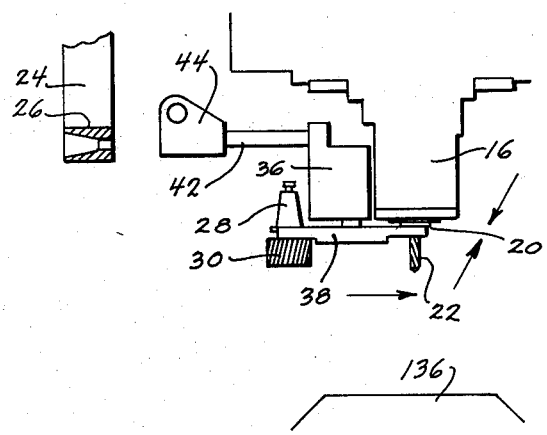

Base 44 is pivotable between a first position, shown in FIG. 9a, which places housing 36 and tool transfer arm 38 adjacent to tool storage magazine 24, and a second position, shown in FIG. 9b, which places housing 36 and tool transfer arm 38 adjacent to spindle 18. In pivoting from its first position to its second position, or vice versa, base 44 rotates through an angle of 90°. Base 44 is pivoted between its two positions by power actuated means which is not shown in the drawings but which will be obvious to skilled in the art.

Figure 9D:
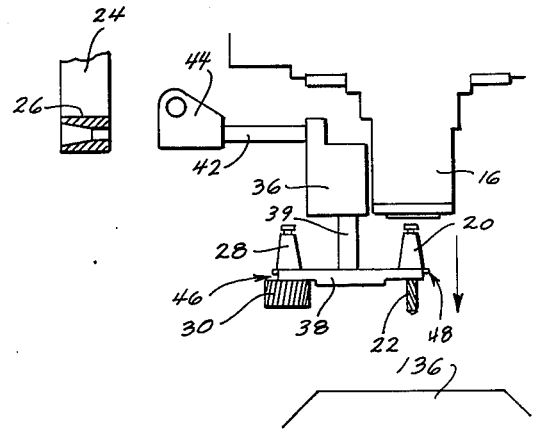
Figure 9E:
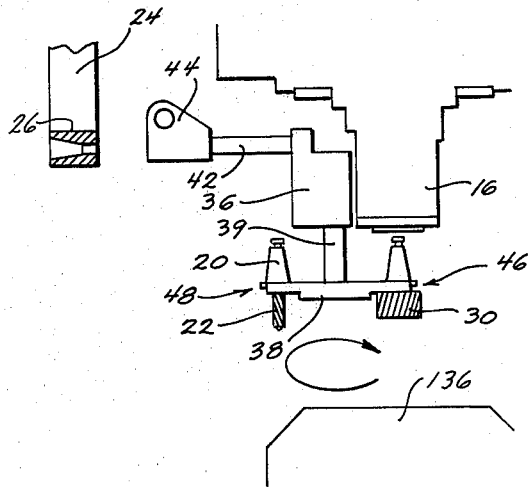

In addition to the above-described movements of arm 42 and base 44, tool transfer arm 38 can be pivoted by power actuated means (not shown) through a 180° arc about its pivot axis 40, as indicated in FIGS. 9d and 9e, to interchange the position of two pairs of toolholder clamps 46 and 48 on opposite ends of tool transfer arm 38.

Tool transfer arm 38 is best shown in FIG. 10 (exploded perspective), FIG. 4 (plan view) and FIGS. 5-8 (front elevation views). Referring first to FIGS. 10 and 5, tool transfer arm 38 has an arm portion 50 containing a central hub 52 which has a central bore 54 (FIG. 10) for receiving rotary shaft 39 and is secured thereto by nut 56. Arm portion 50 is thereby rigidly secured to rotary shaft 39 for rotation therewith through a 180° arc and movement between the extended and retracted positions of shaft 39. The outer end of bore 54 is chamfered at 58 (FIG. 10).

The opposite lower ends of arm portion 50 are shaped at 60a and 60b to form fixed jaws adapted to receive a standard toolholder 62 (FIG. 4) having a grooved flange 64. Tapered rollers 66a and 66b (FIG. 10) which are shaped to engage the groove in toolholder flange 64, are pivotally attached in slots 68a and 68b respectively in jaw surfaces 60a and 60b by pivot pins 67a and 67b and are positioned to engage toolholder flange 64.

Figure 3:
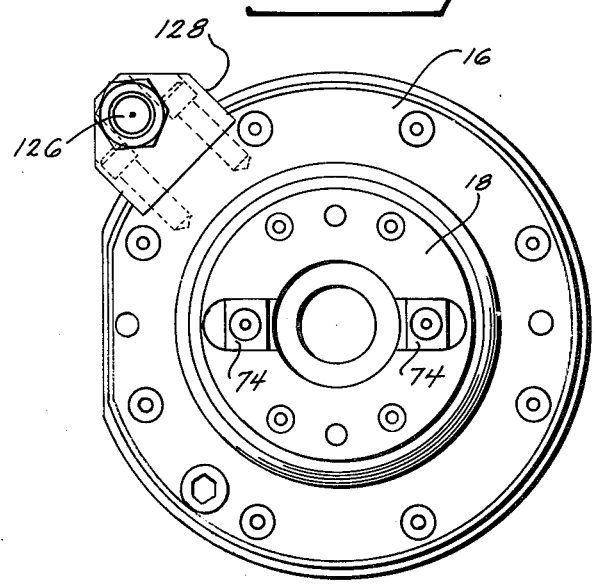
FIG. 3 is a front elevation view of the spindle head shown in FIG. 2.

Relatively thin web portions 70a and 70b rise from the lower portion of arm 50 and are preferably integrally joined thereto as by being part of a common cast or machined steel unit. Alignment keys 72a and 72b are attached by machine screws to the outer ends of web portions 70a and 70b and are positioned to engage conventional keyways in toolholders 62 which are also engaged by the spindle drive keys 74 (FIG. 3). Alignment keys 72a and 72b insure that toolholders 62 will properly engage spindle drive keys 74 when toolholders 62 are inserted into spindle 18.

Webs 70a and 70b have holes 76a and 76b for receiving pivot pins 78a and 78b, respectively, which also extend through holes 80a and 80b in movable jaw members 82a and 82b and serve to pivotally attach movable jaw members 82a and 82b to their respective fixed jaw members 60a and 60b. Movable jaw members 82a and 82b are curved at 84a and 84b to match toolholder flange 64 and have tapered rollers 86a and 86b pivotally attached to slots 88a and 88b therein by pivot pins 87a and 87b for engaging the groove in toolholder flange 64.

Movable jaws 82a and 82b are both pivotable between an open position, shown in the right hand side of FIGS. 6 and 7, and a closed position, shown in the right hand side of FIGS. 5 and 8. In the open position of movable jaws 82a and 82b, a toolholder flange 64 can be inserted between fixed jaws 60a and 60b and movable jaws 82a and 82b, or can be removed therefrom, but in the closed position of movable jaws 82a and 82b, a toolholder flange 64 therebetween is clamped in place with the rollers 66a, 66b and 86a, 86b, engaged in the groove of toolholder flange 64 and bearing against the margins thereof to clamp the toolholder between fixed jaws 60a, 60b and movable jaws 82a and 82b.

Movable jaws 82a and 82b are moved between their open and closed positions by clamp arms 90a and 90b which are pivotally attached to actuation arms 92a and 92b which extend inwardly from the upper portion of movable jaws 82a and 82b and slide in a slot 94 in the upper central portion of transfer arm portion 50. Clamp arms 90a and 90b are clamped to their respective actuation arms 92a and 92b by pivot pins 96a and 96b which extend through holes 98a and 98b, respectively, and also through holes 100a and 100b. Clamp arms 90a and 90b are slotted at 102a and 102b to slidably fit over actuation arms 92a and 92b. On the lower ends of clamp arms 90a and 90b, guide pins 104a and 104b pass through holes 106a and 106b and engage arcuate guide slots 108a and 108b in webs 70a and 70b.

Detent assemblies 110a and 110b are attached to the lower rear of clamp arms 90a and 90b for applying a small holding force to help hold movable jaws 82a and 82b in their closed position. Detent assemblies 110a and 110b are not, however, an essential part of the invention and can be omitted if desired since the relationship of the pivotal axes of pivot pins 78a, 78b, 96a, 96b, and 104b is arranged to provide an inherent locking action in the closed position with regard to opening forces applied to movable jaws 82a and 82b, and is explained hereinafter.

The structure of detent assembly 110b is shown in FIG. 11. It includes a threaded plug 112b which screws into a threaded hole in clamp arm 90b and has a hollow end containing a spring 113b which bears against a ball 116b that seats in a dimple 118b in web 70b. Plug 112b is slotted at its outer end for adjustment purposes and can be locked in the desired position by a nut 114b. The other detent assembly 110a is identical in structure to the above-described detent assembly 110b.

The top of each clamp arm 90a and 90b is cut on a double slope comprising a first sloping surface 120a and 120b (FIG. 10) and a second sloping surface 122a and 122b which intersect at ridges 124a and 124b which are positioned to interact with a conical abutment 126, as shown in FIG. 4, for unclamping purposes as described hereinafter.

As best shown in FIGS. 2, 3, 4 and 5, conical abutment 126 is mounted on a bracket 128 which is bolted to the nose of spindle head 16, as shown in FIG. 3, so that abutment 126 extends slightly beyond the nose of spindle 18, as shown in FIG. 4. When tool transfer arm 38 inserts a toolholder 130 into spindle 18, it is first aligned in front of spindle 18 so that toolholder 130 and spindle 18 are coaxial, and then tool transfer arm 38 is moved toward spindle 18 parallel to the axis 129 of conical abutment 126 to insert toolholder 130 therein. Near the end of the inward travel of tool transfer arm 38, conical abutment 126 strikes the ridge 124b formed by sloping surfaces 120b and 122b on the top of clamp arm 90b. As tool transfer arm 38 continues its inward travel parallel to the axis 129 of conical abutment 126, conical abutment 126 bears against clamp arm 90b along ridge 124b and moves clamp arm 90b toward its open position. After tool transfer arm 38 reaches its innermost position with toolholder 130 fully inserted in spindle 18, tool transfer arm 38 is moved laterally away from spindle 18 (to the left in FIG. 4) transverse to the axis 129 of conical abutment 126, which causes conical abutment 126 to bear against sloping surface 120b and force clamp arm 90b to its fully open position as shown in FIG. 6. FIG. 5 shows the position of tool transfer arm 38 when clamp arm 90b first strikes abutment 126 to initiate the opening process of clamp arm 90b and FIG. 6 shows the position of tool transfer arm 38 when clamp arm 90b is in its fully open position thus fully opening movable jaw 82b.

Another conical abutment 127 (FIG. 1) is mounted on tool transfer station 34 of tool storage magazine 24 for opening the toolholder jaws when tools are inserted into tool receptacles 26.

The above-described unclamping process is self-energized in the sense that the opening movement of clamp arm 90b is caused by the movements of tool transfer arm 38 toward and transverse to spindle 18. A similar self-energized clamping process is initiated when tool transfer arm 38 is rotated through 180° and the open clamp is moved laterally toward spindle 18 to engage a toolholder therein for removal purposes. As shown in FIG. 7, the side surface 132 of clamp arm 90a contacts a cylindrical abutment 134 on the bottom of spindle head 16 (shown in side elevation in FIG. 2) which bears against clamp arm 90a and moves it from its open position, shown in FIG. 7, to its closed position, shown in FIG. 8, as tool transferm arm 38 approaches spindle 18 laterally transverse to the axis 137 of cylindrical abutment 134.

Another cylindrical abutment 135 (FIG. 1) is mounted on the tool transfer station 34 of tool storage magazine 24 to cause a similar self-energized clamping action when toolholders are removed from tool storage magazine 24.

FIGS. 9a through 9r show the movements of tool transfer arm 38, tool transfer housing 36, and tool transfer base 44 during the process of transferring a new tool into spindle 18 and returning the tool previously clamped therein back to the appropriate storage location. The process starts with the relationship of parts shown in FIG. 9a. A toolholder 20 carrying a tool 22 is clamped in spindle 18. A different toolholder 28 carrying a tool 30 is clamped in one end of tool transfer arm 38, the other end of tool transfer arm 38 being empty. Tool transfer housing 36 is adjacent to tool storage magazine 24 with tool housing arm 42 in its central position. The various movements involved in the tool transfer process are described below in the order of their occurrence.

(1) Spindle 18 is moved to the tool transfer position shown in FIG. 9a, and the rotation thereof is stopped at a predetermined angular position which will place the keyways of toolholder 20 in the correct angular orientation with respect to alignment keys 72a and 72b of tool transfer arm 38. This is done by conventional control means (not shown).

(2) Tool transfer base 44 is rotated through 90° toward spindle 18 to bring tool transfer arm 38 adjacent to spindle 18, as shown in FIG. 9b.

(3) Tool housing support arm 42 is moved to its extended position, as shown in FIG. 9c, to move tool transfer arm 38 laterally across the nose of spindle 18 to clamp toolholder 20 in the open end of tool transfer arm 38 by the self-energized clamping action described previously.

(4) Tool transfer arm 38 is moved to its extended position, shown in FIG. 9d, to remove toolholder 20 from spindle 18.

(5) Tool transfer arm 38 is rotated through 180° to interchange the positions of toolholders 20 and 28, as shown in FIG. 9e.

Figure 9F:
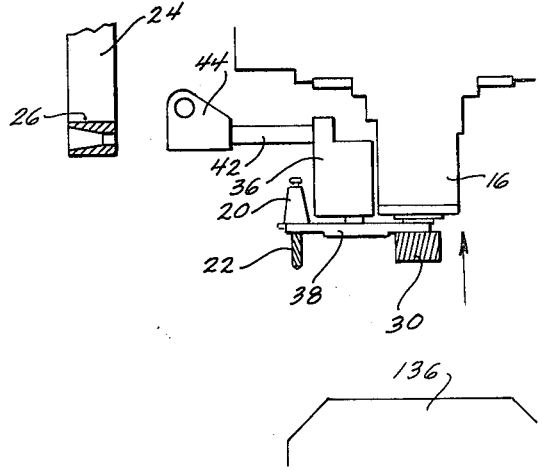
Figure 9G:
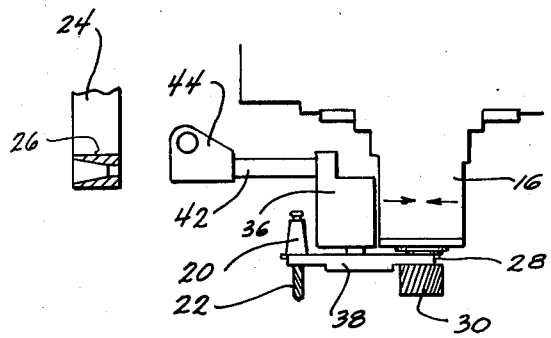

(6) Tool transfer arm 38 is moved back to its retracted position to insert toolholder 28 into spindle 18, as shown in FIG. 9f. At the end of this movement, the self-energized unclamping operation is initiated as previously described.

(7) Toolholder 28 is clamped in spindle 18 by the clamping apparatus thereof, which is not shown in the drawings.

Figure 9H:
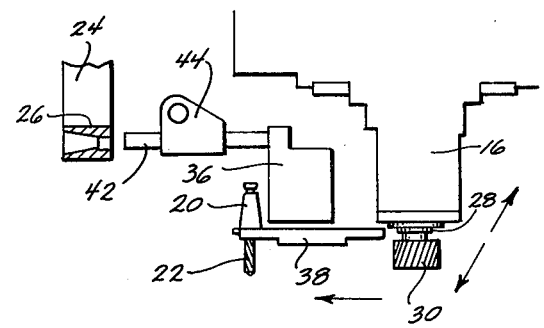

(8) Tool housing support arm 42 is moved back to its central position, as shown in FIG. 9h, to move tool transfer arm 38 laterally across the nose of spindle 18 to complete the self-energized unclamping operation initiated in step (6).

Figure 9I:
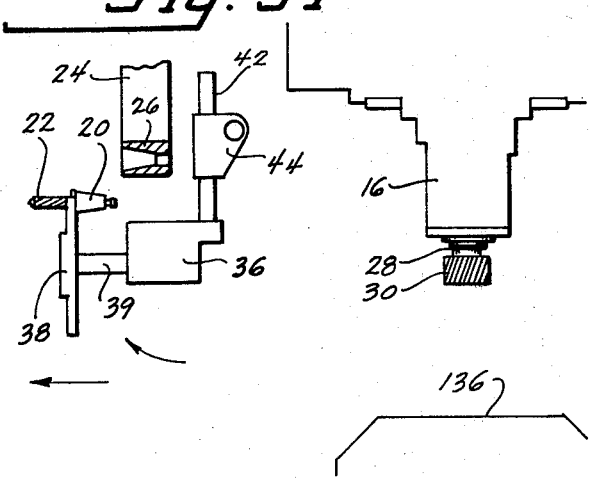

(9) Tool transfer base 44 is rotated through 90° toward tool storage magazine 24 and tool transfer arm 38 is moved to its extended position, as shown in FIG. 9i.

Figure 9J:
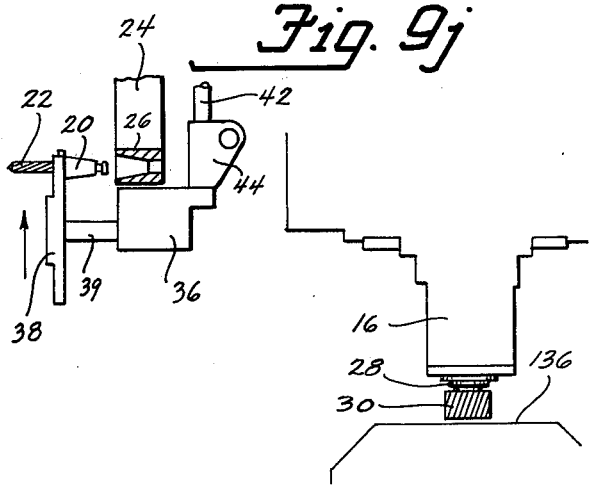

(10) Tool housing support arm 42 is moved to its retracted position to align toolholder 20 with toolholder receptacle 26, as shown in FIG. 9j. While this movement is taking place, spindle 18 is rotated and moved toward a workpiece 136 to perform work thereon.

Figure 9K:
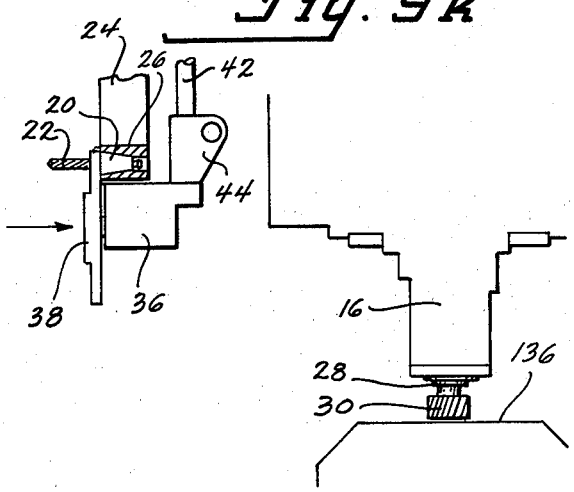

(11) Tool transfer arm 38 is moved to its retracted position to insert toolholder 20 into toolholder receptacle 26, as shown in FIG. 9k. At the end of this movement, the self-energized unclamping action described previously is initiated.

Figure 9L:
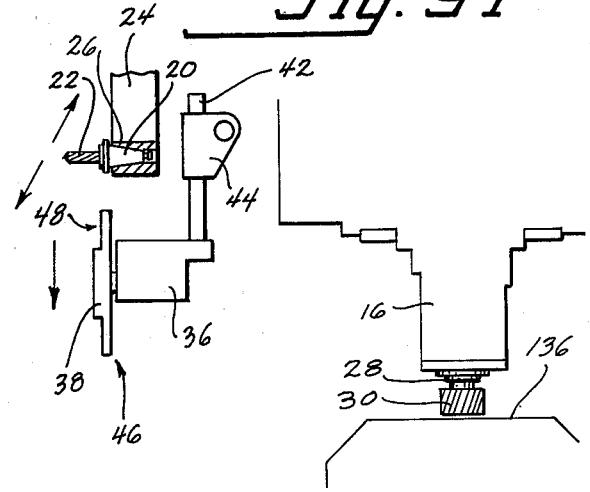

(12) Tool housing support arm 42 is moved to its extended position, as shown in FIG. 9l, to move tool transfer arm 38 across receptacle 26 to complete the self-energized unclamping action initiated in step (11).

Figure 9M:
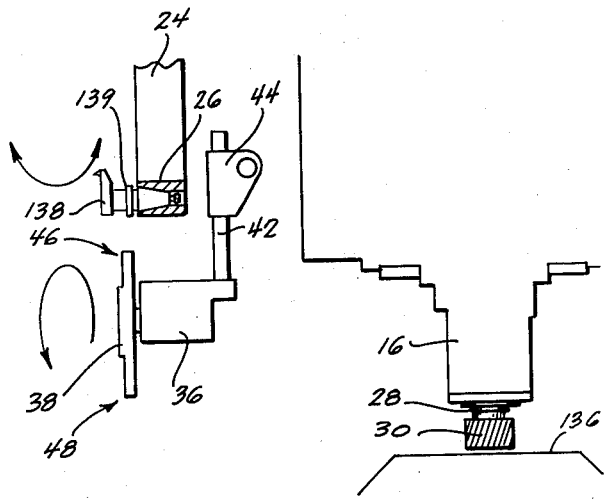

(13) Tool transfer arm 38 is rotated through 180° to interchange the position of toolholder clamps 46 and 48. At the same time, tool storage receptacles 26 are indexed to bring the next tool 138 (FIG. 9m) into loading position.

Figure 9N:
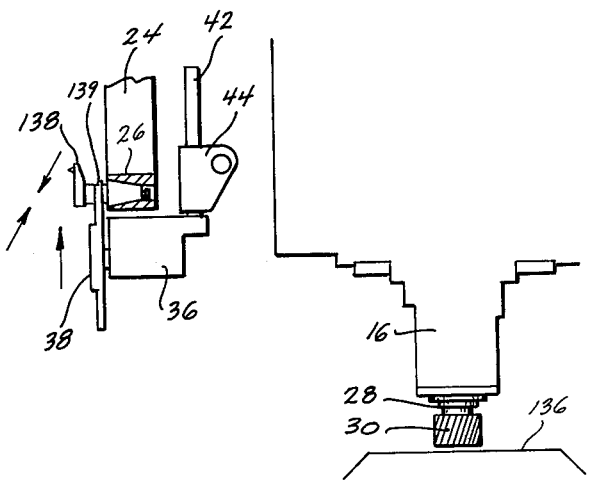

(14) Tool housing support arm 42 is moved to its retracted position to move tool transfer arm 38 laterally across receptacle 26 to clamp onto the new toolholder 139 as shown in FIG. 9n. During this movement, the self-energized clamping action described previously is actuated.

Figure 9O:
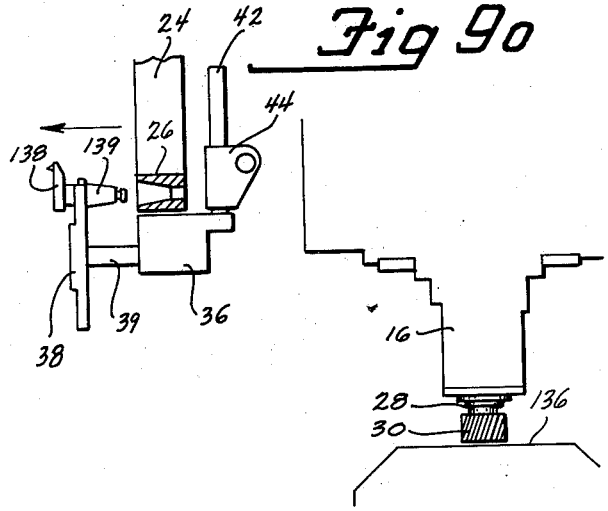

(15) Tool transfer arm 38 is moved to its extended position to remove toolholder 139 from receptacle 26, as shown in FIG. 9o.

Figure 9P:
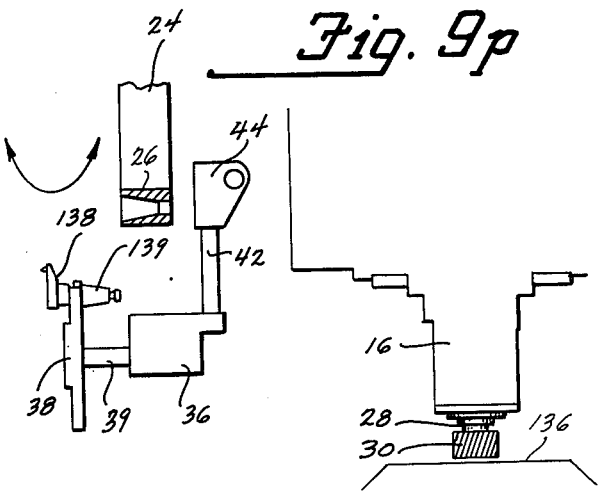

(16) Tool housing support arm 42 is moved to its extended position, as shown in FIG. 9p, and tool storage receptacles 26 are indexed to bring the receptacle 26 which corresponds to tool 30 into loading position.

Figure 9Q:
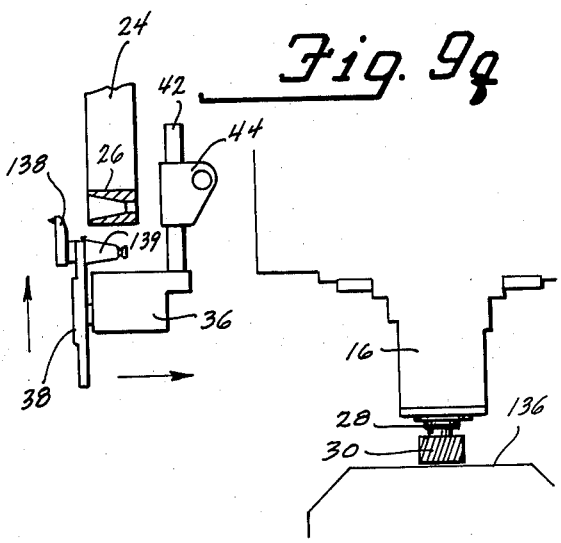
Figure 9R:
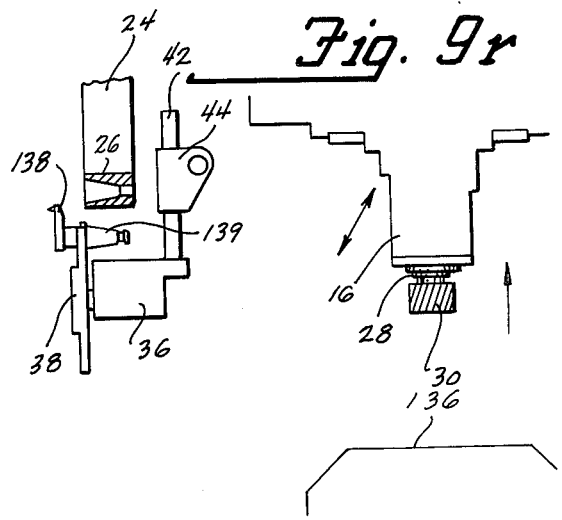

(17) Tool housing support arm 42 is moved to its central position, as shown in FIG. 9q, in preparation for the next tool transfer operation. If the machining operation, which has been proceeding during the preceding steps (10) to (17) is not completed, the tool transfer operation is halted until the machining is completed.

(18) At the end of the machining operation, spindle 18 is moved to the position shown in FIG. 9r, which is the first step of the next tool transfer operation. The foregoing steps (1) through (17) are then repeated.

Another important feature of the invention is that the axes of pivot pins 78a, 78b, 96a, 96b, and 104a, 104b are arranged to provide a self-locking action in the closed position of movable jaws 82a and 82b to prevent opening forces applied to jaws 82a and 82b from opening the jaws without preventing the jaws from being opened by clamp arms 90a and 90b. This is done by positioning pivot pins 78a, 78b, 96a, 96b, and 104a, 104b, as shown in FIG. 5, so that a line 140 drawn in a plane parallel to the central plane of tool transfer arm 38 between the axis of pin 96b and the axis of pin 104b is perpendicular to a line 142 drawn in the same plane between the axis of pin 78b and the axis of pin 104b when clamp arm 90b and movable jaw 82b are in their closed position, as shown in FIG. 5. Because of this right angle configuration of lines 140 and 142, opening forces applied to movable jaw 82b tends to lock jaw 82b in the closed position rather than tending to open it. However, opening forces applied to clamp arm 90b will open movable jaw 82b without any trouble.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. In an article transfer mechanism;
    a frame;
    an article transfer arm movably carried by said frame for transferring articles to and away from an article support, said article transfer arm having at least one grip for gripping the articles during the article transfer operation, said grip comprising:
    a fixed jaw;
    a movable jaw shiftable to a closed position for cooperating with said fixed jaw to grip an article between them, said movable jaw being also shiftable to an open position to release the article between said jaws;
    a clamp arm secured to said movable jaw for shifting said movable jaw between its open and closed positions;
    a first abutment on said article support to engage and actuate said clamp arm for shifting said movable jaw toward its open position when said transfer arm is moving an article into said article support; and
    a second abutment on said article support to engage and actuate said clamp arm for shifting said movable jaw to its closed position into gripping engagement with the article when said transfer arm is moving toward an article in said support.

2. An article transfer mechanism according to claim 1 including locking means actuated by said clamp arm to lock said movable grip in the closed position, said locking means being released by the actuation of said clamp arm when it is shifting said movable jaw to its open position.

3. The article transfer mechanism of claim 1 wherein said second abutment means is conical in shape and further comprising:
    means for moving said tool transfer arm parallel to the axis of said conical abutment so as to cause said abutment to bear against said clamp arm to initiate the opening movement thereof; and
    means for subsequently moving said tool transfer arm transverse to the axis of said conical abutment so as to complete the opening movement of said clamp arm.

4. The article transfer mechanism of claim 3 wherein the top surface of said clamp arm is sloped to bear against said conical abutment to cause opening movement of said clamp arm both when said clamp arm is moved parallel to the axis of said conical abutment and when said clamp arm is moved transverse to the axis of said conical abutment.

5. The article transfer mechanism of claim 3 wherein said first abutment means is cylindrical in shape and further comprising:
    means for moving said tool transfer arm transverse to the axis of said cylindrical abutment so as to cause said cylindrical abutment to bear against said clamp arm to move said clamp arm from its open to its closed position.

6. The article transfer mechanism of claim 1 wherein said clamp arm is pivotally mounted on said movable jaw and further comprising:
    a guide pin attached to said clamp arm and engaged in a guide slot in said article transfer arm; and
    wherein a line drawn in the plane of said article transfer arm between the axis of said guide pin and the pivotal axis between said movable jaw and said tool transfer arm is substantially perpendicular to a line drawn in the same plane between said guide pin and the pivotal axis between said clamp arm and said movable jaw in the closed position of said movable jaw, thereby locking said movable jaw in its closed position with respect to opening forces applied to said movable jaw but not with respect to opening forces applied to said clamp arm.

7. The article transfer mechanism of claim 1 wherein said tool transfer arm is attached to a shaft which is rotatably mounted on said frame and is movable axially between an extended and a retracted position.

8. The article transfer mechanism of claim 7 and further comprising:
    an article transfer base pivotally mounted on said frame for rotary movement through a 90° arc; and
    a support arm slidably mounted on said article transfer base for movement between and extended, retracted and central position transverse to the pivotal axis of said article transfer base, and said article transfer arm being mounted on an end of said support arm to be moved thereby into and out of proximity with said article storage magazine and said article support.

9. The article transfer mechanism of claim 1 and further comprising:
a second grip on said article transfer arm for gripping articles during the article transfer operation, said second grip comprising:
a second fixed jaw;
a second movable jaw shiftable to a closed position for cooperating with said second fixed jaw to grip an article between them, said second movable jaw being also shiftable to an open position to release the article between said jaws; and
a second clamp arm secured to said second movable jaw for shifting said movable jaw between its open and closed positions.

* * * * *